United States Patent [19]
Cook

[11] 3,871,124
[45] Mar. 18, 1975

[54] ANIMAL TRAP

[76] Inventor: Rodney G. Cook, P.O. Box 342, Camden, Ark. 71701

[22] Filed: Sept. 7, 1973

[21] Appl. No.: 395,053

[52] U.S. Cl. .................................................. 43/88
[51] Int. Cl. ............................................ A01m 23/26
[58] Field of Search ............... 43/88, 90, 92, 77, 85

[56] References Cited
UNITED STATES PATENTS

| | | | |
|---|---|---|---|
| 1,191,909 | 7/1916 | Phillips | 43/88 |
| 1,421,610 | 7/1922 | Svehla | 43/88 |
| 2,123,789 | 7/1938 | Miller | 43/88 |
| 2,292,695 | 8/1942 | Johnson | 43/90 |

*Primary Examiner*—Warner H. Camp
*Attorney, Agent, or Firm*—Shlesinger, Arkwright, Garvey & Dinsmore

[57] ABSTRACT

The invention relates to an animal trap of the type designed to be buried in the ground and which includes a pair of jaws adapted to close on the animal's leg when the trap is tripped. It includes an outer housing, an inner housing movably mounted within the outer housing and a spring biased jaw assembly mounted within the inner housing. When the trap is triggered, a release mechanism thrusts the inner housing and jaw assembly toward the animal and then activates the trigger mechanism which releases the spring biased jaws to close on the animal's leg. The jaws open inwardly so that any attempts by the animal to withdraw its leg results in their closing more tightly. Furthermore, the jaw assembly includes a cooperating rack and pawl mechanism which prevents any opening movement of the jaws once the trap has been tripped.

14 Claims, 9 Drawing Figures

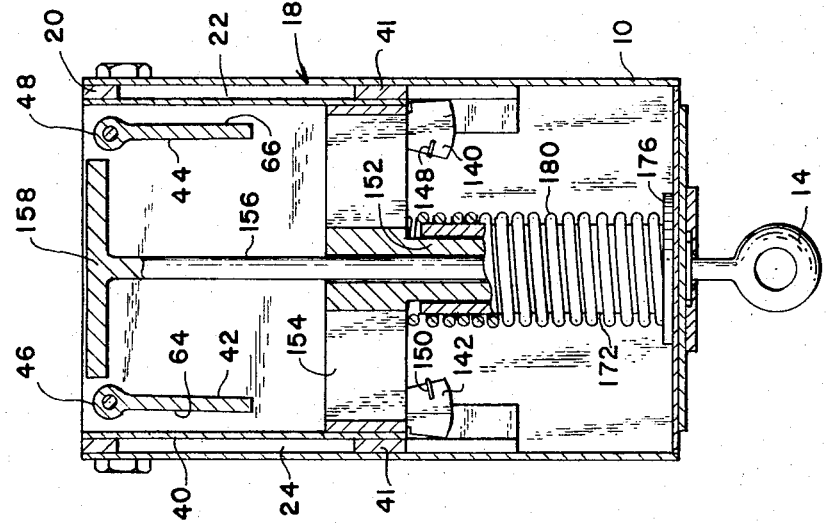
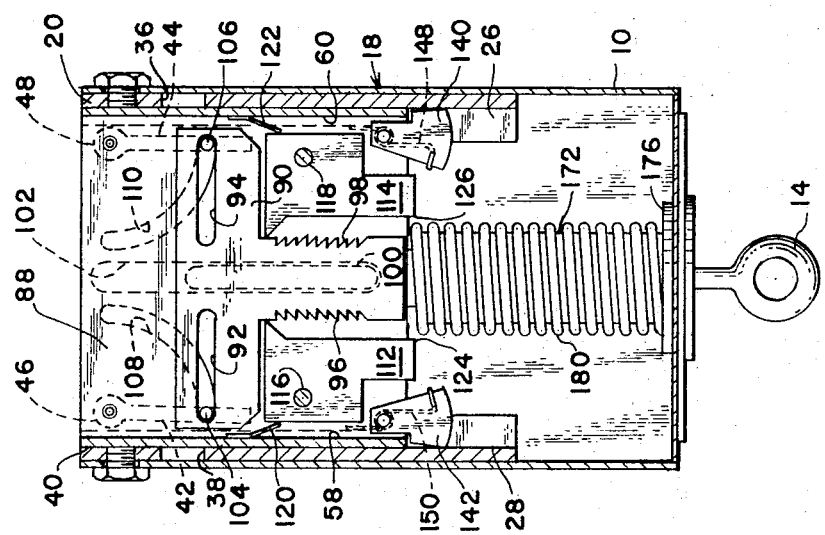
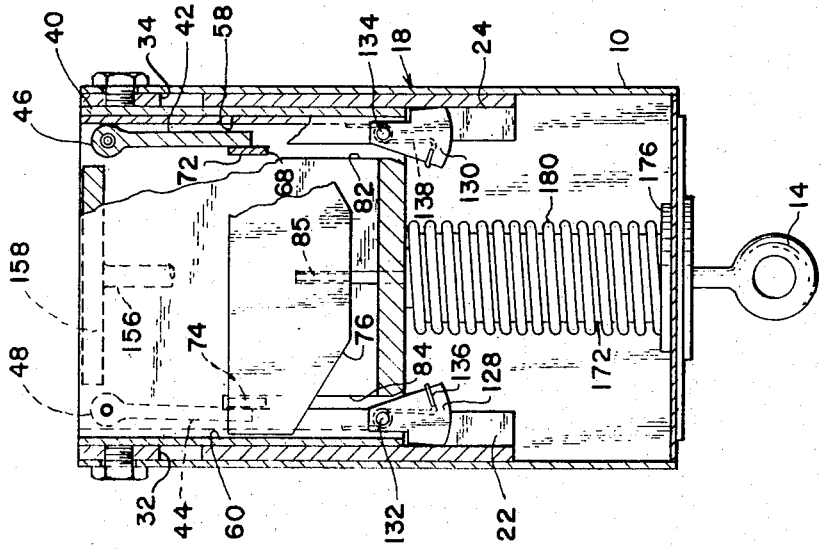

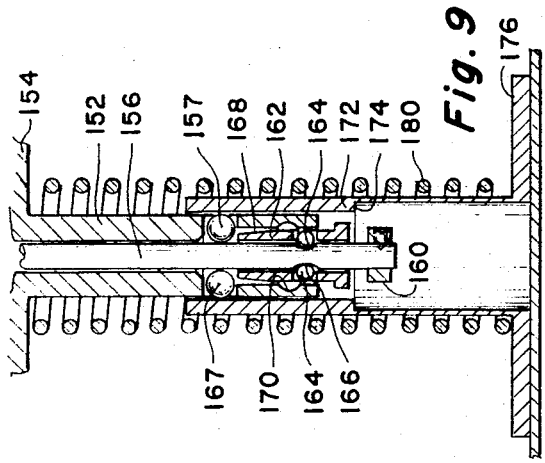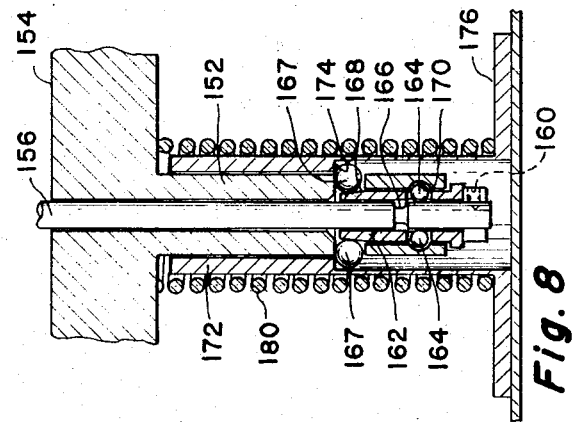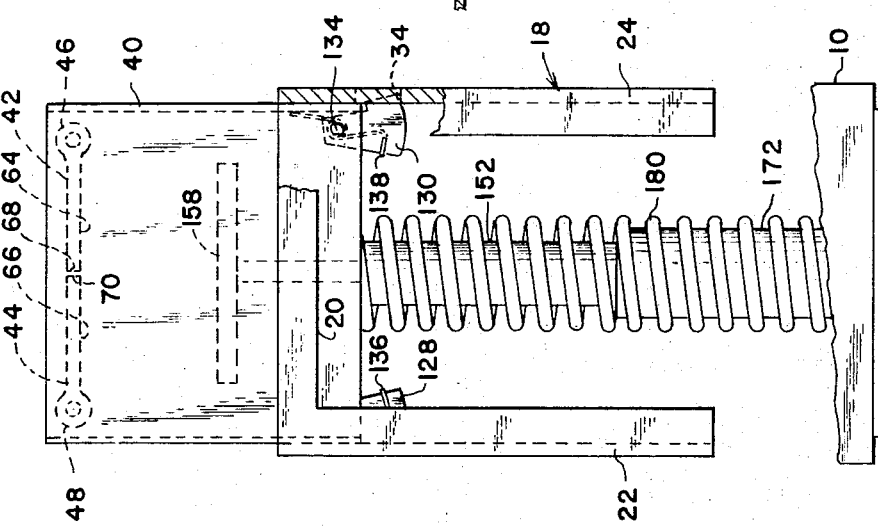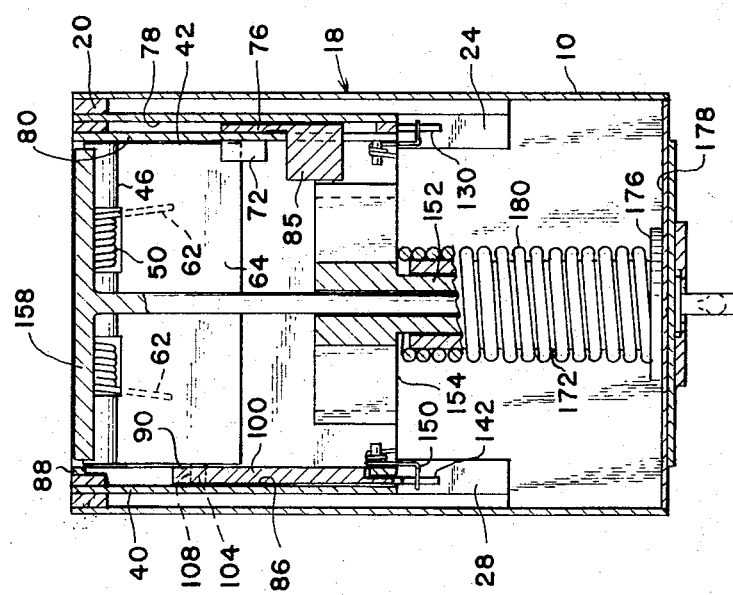

ANIMAL TRAP

BACKGROUND OF THE INVENTION

The trapping of wild animals, whether alive of dead is an industry which has been known to mankind for centuries and has engendered considerable activity in the designing of improved animal traps. In some instances the preservation of the animal's pelt is of foremost consideration whereas in others it may be desired to trap the animal alive and uninjured in order that it may be maintained in captivity in zoos or used for breeding.

While the prior art is replete with examples of animal traps, certain drawbacks and problems with regard to them continue to exist. In some cases, the animal has such quick reflexes that it is able to withdraw its leg from the trap after tripping the trigger mechanism but prior to the actual closing of the jaws. In such an instance, the animal has not only escaped being caught but has sprung the trap thereby rendering it ineffective until it is reset by the trapper. Another difficulty with many of the prior art devices is that the jaws damage the animal's pelt and substantially decreases its commercial value or seriously injure the animal thereby causing considerable suffering before the animal dies. Also, in the case where it is desired to trap the animal alive, it is of utmost importance that no permanent injury be inflicted. A further drawback to many animal traps lies in the insensitivity of their trigger mechanisms and is especially prevalent in those traps wherein the jaws close under a substantial amount of force.

OBJECTS OF THE INVENTION

It is, therefore, an object of this invention to provide an animal trap wherein the trigger mechanism is extremely sensitive to an applied force and which requires negligible movement of the trip plate to be triggered.

Another object of this invention is to provide an animal trap including a pair of jaws which are positively prevented from being opened once the animal's leg has been grasped thereby.

A further object of this invention is to provide an animal trap wherein any attempts of the animal to withdraw its leg from the jaws causes them to close more tightly.

Another object of this invention is to provide an animal trap which may be mounted flush with the surface of the ground yet capable of securely grasping the animal's leg with only slight downward movement of the trip plate.

A still further object of this invention is to provide an animal trap which is capable of trapping fur bearing animals without any significant damage to their pelts.

Yet another object of this invention is to provide an animal trap which is capable of trapping animals alive and without inflicting any injury thereon.

A further object of this invention is to provide an animal trap which prevents the animal from withdrawing its leg after the trap has been triggered and prior to the complete closing of the jaws.

A still further object of this invention is to provide an animal trap in which the trip plate substantially overlies the trap mechanism to thereby present maximum trip area in relation to the size of the trap.

These and other objects of this invention will become apparent from a reading of the description with reference to the appropriate drawings.

SUMMARY OF THE INVENTION

The invention relates to an animal trap including a housing, a triggerable jaw mechanism for closing onto and grasping a portion of an animal and release means associated with the housing and the jaw mechanism for thrusting the jaws toward the animal prior to the triggering thereof.

BRIEF DESCRIPTION OF THE DRAWINGS

FIG. 3 is a sectional view of FIG. 2 taken along line 3—3 and viewed in the direction of the arrows with a portion thereof broken away to illustrate the details of construction;

FIG. 4 is a sectional view of FIG. 2 taken along line 4—4 and viewed in the direction of the arrows;

FIG. 5 is a sectional view of FIG. 2 taken along line 5—5 and viewed in the direction of the arrows;

FIG. 6 is a sectional view of FIG. 2 taken along line 6—6 and viewed in the direction of the arrows;

FIG. 7 is a side elevational view of the invention in its tripped position with portions thereof broken away to illustrate the details of construction;

FIG. 8 is an enlarged fragmentary sectional view of the trigger mechanism in its set position; and FIG. 9 is an enlarged fragmentary sectional view of the trigger mechanism in its tripped position.

DETAILED DESCRIPTION OF THE PREFERRED EMBODIMENT

Figure 1:
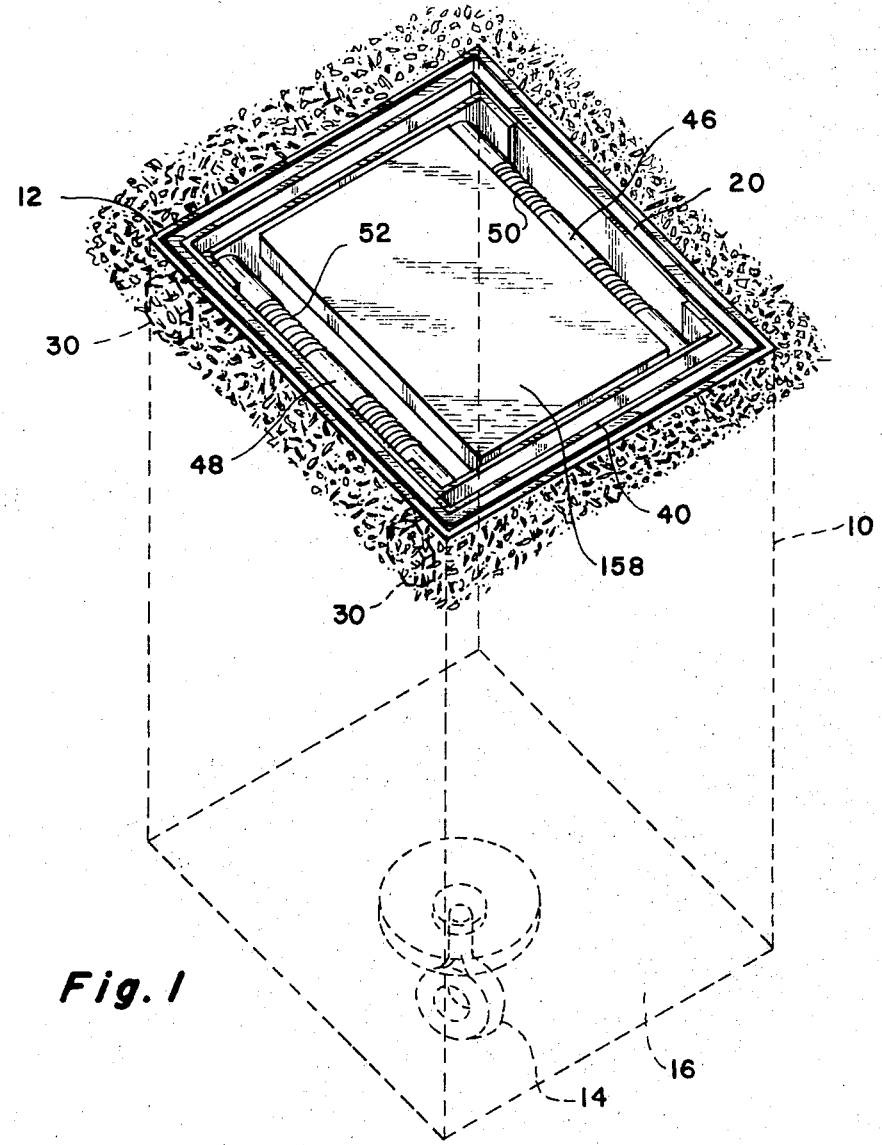
FIG. 1 is a perspective view of the invention in its set position and buried in the ground.
Figure 2:
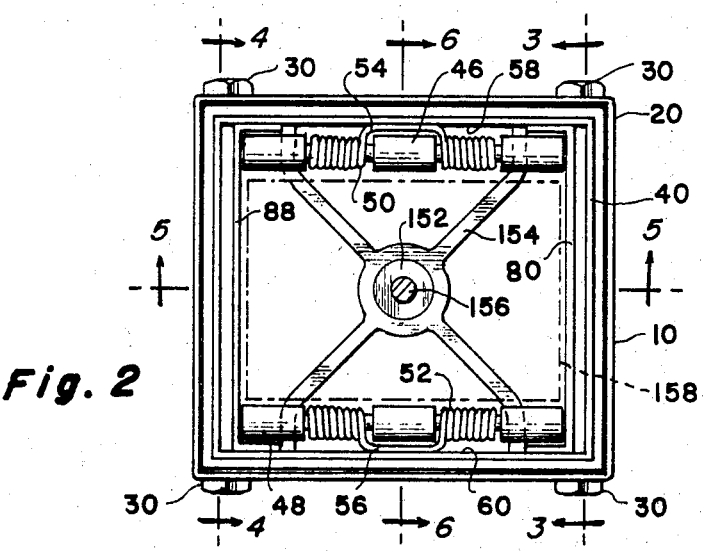
FIG. 2 is a top plan view of the invention in its set position.

As illustrated in FIG. 1, the trap forming the present invention includes a substantially rectangular outer housing 10 adapted to be buried in the ground with its upper edge 12 flush with the surface of the ground. The housing 10 retains the trap mechanism and includes a swivel eye 14 attached to its lower surface for the purpose of anchoring the trap to prevent its being removed by the animal once it is caught. A frame 18 comprising an upper portion 20 and four parallel guide legs 22, 24, 26 and 28 extending therefrom is mounted within outer housing 10 by means of screws 30. The legs 22, 24, 26, and 28 are preferably right angular in shape and have apertures 32, 34, 36 and 38, respectively, therein for a purpose to be described below. It is preferable that the dimensions of the frame upper portion 20 and legs 22, 24, 26 and 28 be such that frame 18 fits rather closely within outer housing 10 but yet can be removed with little difficulty.

An inner housing 40 is slidably positioned within frame 18 and is preferably rectangular and substantially open at both its upper and lower ends. Stop blocks 41 are secured to inner housing 40 and serve to limit its upward travel in frame 20. A pair of jaws 42 and 44 are rotatably mounted within inner housing 40 by means of hinges 46 and 48, respectively, and urged to their released positions (FIG. 7) through the action of coiled springs 50 and 52. The springs 50 and 52 include center portions 54 and 56 which contact the inner walls 58 and 60 of inner housing 40 as well as free ends 62 which contact the under surfaces 64 and 66 of jaws 42 and 44 thereby forcing the jaws to rotate inward and upward such that their free ends 68 and 70 move toward each other.

When the jaws 42 and 44 are in their set position (FIG. 3), they are retained vertically adjacent inner walls 58 and 60 by means of projections 72 and 74 which project outwardly from jaw dog plate 76, the latter being slidably mounted between the inner wall 78 of inner housing 40 and end plate 80 (FIG. 5). End plate 80 is preferably welded to inner housing inner walls 58 and 60 and includes a pair of vertical slots 82 and 84 through which projections 72 and 74 extend such that they may engage jaws 42 and 44 to lock the same in their set positions. Jaw dog plate 76 is retained in its raised or set position against the influence of gravity by means of the frictional forces created by jaws 42 and 44 bearing against projections 72 and 74 as the former tend to rotate inwardly under the influence of springs 50 and 52. It should be noted that when jaw dog plate 76 is moved downwardly by leg 85 a sufficient distance to permit jaws 42 and 44 to clear projections 72 and 74, the jaws will snap shut. A trigger lug 85 projects from the jaw dog plate 76 through a slot in end plate 80 for the purpose of triggering the jaws 42 and 44.

Sandwiched between inner housing wall 86 and a slotted end plate 88 (FIGS. 5 and 4), is a jaw synchronizing plate 90 is preferably T-shaped and includes horizontal slots 92 and 94 in its upper portion, two sets of teeth 96 and 98 cut in its lower portion and an elongated projection 100 which extends through a vertical guide slot 102 in end plate 88. Jaws 42 and 44 are provided with laterally extending lugs 104 and 106 which extend through arcuate slots 108 and 110 in end plate 88 as well as the horizontal slots 92 and 94 in synchronizer plate 90. As the jaws 42 and 44 rotate through their respective arcs, lugs 104 and 106 are guided by slots 108 and 110 and serve to cause synchronizer plate 90 to be raised or lowered in the narrow space bounded by end plate 88 and the inner wall 86 of inner housing 40. Since synchronizer plate 90 is permitted only vertical movement, the rotation of jaws 42 and 44 is synchronized through the cooperation of projections 104 and 106 sliding in slots 92 and 94.

A pair of pawls 112 and 114 are pivotally mounted between the inner wall 86 of inner housing 40 and end plate 88 on pins 116 and 118. The pawls 112 and 114 are urged into engagement with teeth 96 and 98 by means of a pair of leaf springs 120 and 122, the latter being mounted on inner housing inner walls 58 and 60. The pawls 112 and 114 as well as teeth 96 and 98 are shaped such that the synchronizer plate 90 is permitted only vertical movement. Lower portions 124 and 126 of pawls 112 and 114 extend below the lower edge of end plate 88 and inner housing 40 to permit the pawls to be rotated in such a manner that they disengage from teeth 96 and 98 thereby permitting the jaws 42 and 44 to be opened and synchronizer plate 90 to be moved in a downward direction.

A pair of inner housing locking pawls 128 and 130 are pivotally mounted between the inner wall 78 of inner housing 40 and end plate 80 on pins 132 and 134 and urged to contact frame guide legs 22 and 24 through the action of coiled springs 136 and 138. Similarly, inner housing locking pawls 140 and 142 are pivotally mounted between the inner housing inner wall 86 and end plate 88 on pins 144 and 146 and are urged into contact with frame guide legs 26 and 28 by means of coiled springs 148 and 150. When the inner housing 40 is in its upward or released position (FIG. 7), the locking pawls 128, 130, 140 and 142 are forced into the apertures 32, 34, 36 and 38 in frame guide legs 22, 24, 26 and 28, respectively, thereby supporting the inner housing 40 in its fully extended position.

A cylindrical main sleeve 152 is rigidly secured to an X-shaped frame 154 and the latter is welded or otherwise fastened to inner housing 40 such that main sleeve 152 is centered and depends from inner housing 40. A pan shaft 156, which is rigidly fastened to the trip pan 158, extends vertically through main sleeve 152 and terminates with a set collar 160. A tapered trigger sleeve 162 is slidably positioned between main sleeve 152 and pan shaft 156 and houses four small balls 164 which are radially aligned and extend on either side of trigger sleeve 162. Pan shaft 156 also includes an angular groove 166 positioned near its lower end.

The main sleeve 152 houses four larger balls 167 which are radially aligned and positioned at a point in sleeve 152 near the tapered end 168 of trigger sleeve 162 when the latter is in its set position. The larger balls 167 are housed in four apertures extending through main sleeve 152 so that when in the set position, the balls 167 are extended outwardly by means of the tapered end 168 of trigger sleeve 162. The balls 164 housed in trigger sleeve 162 are also retained in four apertures and when in the set position are forced outwardly into the angular groove 170 in trigger sleeve 162 by means of pan shaft 156. When in the set position (FIG. 8), the trip pan 158 is flush with the top edges of both the outer housing 10 and the inner housing 40.

Guide sleeve 172 fits around main sleeve 152 and terminates just below frame 154 when the trap is in the set position. Guide sleeve 172 includes an annular shoulder 174 which contacts the four larger balls 167 when the trap is in the set position and prevents main sleeve 152 from undergoing upward vertical movement until such time as the trap is sprung. Guide sleeve 172 includes a flange 176 which seats on the lower wall 178 of outer housing 10. The main compression spring 180 contacts the under edges of frame 154 as well as flange 176 when it is compressed by forcing inner housing 40 downward in frame 18.

OPERATION

The setting procedure is as follows: With the inner housing 40 and frame 18 removed from outer housing 10 by removing screws 30, the inner housing 40 is held in an inverted position and the jaws forced open while maintaining inward pressure on the lower portions 124 and 126 of pawls 112 and 114. It will be recalled that it is necessary to disengage pawls 112 and 114 from teeth 96 and 98 in order that the synchronizer plate 90 may be lowered and the jaws 42 and 44 opened. When jaws 42 and 44 are in their extreme open or set position, the projections 72 and 74 on jaw dog plate 76 fall under the influence of gravity into a position which, when the jaws 42 and 44 are released, prevents the jaws from closing.

When jaws 42 and 44 are released and the inner housing is rotated to its upright position, jaw dog plate 76 will be maintained in its upward or set position by the frictional forces created as jaws 42 and 44 are urged against projections 72 and 74 by springs 50 and 52. While still inverted, the inner housing 40 is placed on a flat surface and the main spring 180 and guide sleeve 172 are placed over the main sleeve 152. The main spring 180 is then compressed the limit of travel of the guide sleeve 172 and, while in this position, pan shaft 156 is raised until groove 166 is aligned with small balls 164, thus allowing the trigger sleeve 162 to fall downwardly the limit of its travel to a point where the large balls 167 are forced outwardly. The protruding part of each large ball 167 contacts the annular shoulder 174 in guide sleeve 172 so that when main spring 180 is released, guide sleeve 152 will be locked against relative axial movement.

The entire assembly is now again inverted to its upright position and inner housing locking pawls 128, 130, 140 and 142 are simultaneously released so that inner housing 40 may slide downwardly within frame 18 until it is flush therewith. It should be noted that jaw dog plate 76 is held in its raised or set position against the influence of gravity through the action of the frictional forces generated as jaws 42 and 44 are urged against projections 72 and 74 by springs 50 and 52.

When the trap is returned to its upright position, the guide sleeve 172, main sleeve 152, trigger sleeve 162 and pan shaft 156 are locked against relative axial movement and the trip pan held flush with the top of inner housing 40 by the following means: The larger balls 167 tend to move inwardly in main sleeve 152 but are contacted by the tapered portion 168 of trigger sleeve 162. The trigger sleeve 162 tends to drop downwardly but it is prevented from doing so by the four small balls 164 which are housed in the trigger sleeve and extend into annular groove 170. The pan shaft 156 is frictionally held in place by the inward urging of small balls 164 by main sleeve 152 as it is forced upwardly by main spring 180.

The inner assembly is the inserted into outer housing 10 and secured therein by screws 30.

The entire trap may be buried in the ground with the trip pan 158 and the upper portions of the inner and outer housings flush with the surface of the ground. The open end of housing 10 may be sealed with thin plastic or the like and then camouflaged to conceal its presence from the animal.

The following sequence of actions results when an animal steps on the trip pan 158. The animal's weight on the trip pan 158 causes it and the pan shaft 156 to move downward a slight distance until the pan shaft groove 166 is aligned with the small balls 164. The balls 164 then move inward into groove 166 and both the pan shaft 156 and trigger sleeve 162 are now free to move downwardly as a unit. As the tapered portion 168 of trigger sleeve 162 moves away from balls 167, they are free to move inwardly beyond annular shoulder 174 thereby permitting main sleeve 152, trigger sleeve 162 and pan shaft 156 to move upwardly under the force of compressed spring 180. As main sleeve 152 moves upwardly, inner housing 40 is carried with it. Since the trip pan 158 and pan shaft 156 move downwardly only slightly, to spring the trap, the trip pan 158 remains relatively stationary, thereby allowing the trip pan 158 to be contacted on its underside by the tripper lug 85 on jaw dog plate 76. This causes jaw dog plate 76 to move downwardly relative to inner housing 40 so that projections 72 and 74 no longer hold jaws 42 and 44 in their open position and they close on the animal's leg under the influence of springs 50 and 52.

If the inner housing is allowed to move upwardly the limit of its travel when sprung, the inner housing locking pawls 128, 130, 140 and 142 are forced by their respective springs 136, 138, 148 and 150 into the apertures 32, 34, 36 and 38 in frame guide legs 22, 24, 26 and 28 thereby locking the inner housing 40 in its fully extended position. Even if the inner housing 40 is not permitted to travel its full limit when sprung, the action of the animal in attempting to escape will pull the inner housing 40 into its locked position.

As the animal pulls its leg against the jaws in attempting to escape, the jaws only close more tightly and move the synchronizer plate 90 upward thereby allowing the pawls 112 and 114 to engage successively lower teeth in racks 96 and 98. Since the synchronizer plate is permitted to travel only in an upward direction, it is impossible for the animal to force the jaws inwardly once they have assumed a degree of closure. By utilizing the attempts of the animal to escape to provide the main holding force, it is not necessary that strong springs be employed to close jaws 42 and 44 and injury to the animal itself or damge to its pelt is substantially precluded.

While this invention has been described as having a preferred design, it will be understood that it is capable of further modifications. This application is, therefore, intended to cover any variations, uses, or adaptations of this invention following the general principles thereof and including such departures from the present disclosure as come within known or customary practice in the art to which the invention pertains, and as may be applied to the essential features hereinbefore set forth and fall within the scope of this invention or the limits of the appended claims.

What I claim is:

1. An animal trap comprising:
   a. housing means,
   b. resiliently biased closeable jaw means mounted on said housing means for grasping a portion of an animal,
   c. selectively activatable first trigger means associated with said jaw means for permitting said jaw means to close,
   d. resiliently biased release means mounted in said housing means for activating said first trigger means to permit said jaw means to close,
   e. pressure activated second trigger means for activating said release means to activate said first trigger means,
   f. said second trigger means including a pressure operated trip element mounted for vertical rectilinear movement,
   g. said second trigger means further including means for frictionally supporting said trip element in a raised position prior to the activation of said second trigger means.

2. The animal trap of claim 1 and wherein:
   a. said first trigger means is pressure sensitive, and
   b. said second trigger means is considerably more sensitive than said first trigger means.

3. The animal trap of claim 1 and wherein:
   a. said release means includes first storage means for storing a source of energy to activate said first trigger means, and
   b. said jaw means includes second storage means for storing a source of energy to close said jaw means.

4. The animal trap of claim 3 and wherein said storage means are springs.

5. The animal trap of claim 1 and wherein said release means includes platen means for engaging said first trigger means to thereby activate said first trigger means.

6. The animal trap of claim 5 and wherein said platen means is also connected to said trip element to activate said second trigger means.

7. An animal trap comprising:
   a. housing means,
   b. resiliently biased closeable jaw means mounted on said housing means for grasping a portion of an animal,
   c. selectively activatable first trigger means associated with said jaw means for permitting said jaw means to close,
   d. resiliently biased release means mounted in said housing means for activating said first trigger means to permit said jaw means to close,
   e. pressure activated second trigger means for activating said release means to activate said first trigger means, and
   f. said release means including means for moving said jaw means rectilinearly within said housing means toward an animal when the animal activates said second trigger means.

8. The animal trap of claim 7 and wherein said release means includes means for activating said first trigger means after said jaw means have moved rectilinearly a given distance relative to said housing means.

9. An animal trap comprising:
   a. housing means,
   b. resiliently biased closeable jaw means mounted on said housing means for grasping a portion of an animal,
   c. selectively activatable first trigger means associated with said jaw means for permitting said jaw means to close,
   d. resiliently biased release means mounted in said housing means for activating said first trigger means to permit said jaw means to close, and
   e. pressure activated second trigger means for activating said release means to activate said first trigger means,
   f. said second trigger means including relatively movable concentric members.

10. The animal trap of claim 9 and wherein said second trigger means includes means for locking said members against relative movement until said second trigger means is activated.

11. The animal trap of claim 10 and wherein said means for locking said members includes balls housed in said members and extending between said members.

12. An animal trap comprising:
   a. support means,
   b. triggerable jaw means for closing onto and grasping a portion of an animal,
   c. said jaw means being movably mounted on said support means, and
   d. means associated with said support means and said jaw means for thrusting said jaw means toward the animal prior to the triggering of said jaw means.

13. An animal trap comprising:
   a. outer housing means,
   b. inner housing means movably mounted in said outer housing means and having a set position and a released position relative to said housing,
   c. means associated with said inner and outer housing means for urging said inner housing means to its released position,
   d. first trigger means associated with said inner housing means for alternatively maintaining said inner housing means in its set position and releasing said inner housing means to its released position,
   e. jaw means mounted on said inner housing means for engaging a portion of an animal when said jaw means are closed,
   f. said jaw means having an open position and a closed position,
   g. means for urging said jaw means to its closed position, and
   h. second trigger means associated with said inner housing means for alternatively maintaining said jaw means in its open position and releasing said jaw means to its closed position,
   i. said inner housing means including means for actuating said second trigger means to release said jaw means when said housing means is in its released position.

14. An animal trap comprising:
   a. housing means,
   b. resiliently biased closeable jaw means mounted on said housing means for grasping a portion of an animal,
   c. selectively activatable first trigger means associated with said jaw means for permitting said jaw means to close,
   d. resiliently biased release means mounted in said housing means for activating said first trigger means to permit said jaw means to close, and
   e. pressure activated second trigger means for activating said release means to activate said first trigger means,
   f. said release means including means for moving said jaw means toward an animal prior to the activation of said first trigger means.

* * * * *